United States Patent
James (10) Patent No.: US 10,556,600 B2
(45) Date of Patent: Feb. 11, 2020

(54) ASSESSMENT OF HUMAN DRIVING PERFORMANCE USING AUTONOMOUS VEHICLES

(71) Applicant: Toyota Motor Engineering & Manufacturing North America, Inc., Erlanger, KY (US)

(72) Inventor: Michael R. James, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 897 days.

(21) Appl. No.: 14/964,455

(22) Filed: Dec. 9, 2015

(65) Prior Publication Data

US 2017/0166222 A1    Jun. 15, 2017

(51) Int. Cl.
  *B60W 50/14*    (2012.01)
  *G05D 1/00*    (2006.01)
  *B60W 50/00*    (2006.01)

(52) U.S. Cl.
  CPC ........... *B60W 50/14* (2013.01); *G05D 1/0088* (2013.01); *B60W 2050/007* (2013.01); *B60W 2600/00* (2013.01)

(58) Field of Classification Search
  CPC ................. G05D 1/0088; G05D 1/021; G05D 2201/0213; G05D 2201/0201;
  (Continued)

(56) References Cited

U.S. PATENT DOCUMENTS

| | | | |
|---|---|---|---|
| 10,077,056 B1* | 9/2018 | Fields | B60W 40/09 |
| 2009/0243825 A1* | 10/2009 | Schofield | B60Q 1/346 |
| | | | 340/435 |

(Continued)

FOREIGN PATENT DOCUMENTS

| | | |
|---|---|---|
| CN | 104504957 A | 4/2015 |
| JP | 2005250564 A | 9/2005 |

OTHER PUBLICATIONS

Malik, "An Assessment System for Evaluation of Driving Competencies", A thesis submitted for the Degree of Doctor of Philosophy, Jan. 2011, Centre for Accident Research and Road Safety—Queensland, Queensland University of Technology, (241 pages).

*Primary Examiner* — Tuan C To
*Assistant Examiner* — Paul A Castro
(74) *Attorney, Agent, or Firm* — Christopher G. Darrow; Darrow Mustafa PC (57) ABSTRACT

Human driving performance can be assessed using an autonomous vehicle. An autonomous vehicle can have a manual operational mode and one or more autonomous operational modes. While the vehicle is operating in the manual operational mode, driving data relating to a manual driving maneuver can be acquired. The acquired driving data can be evaluated relative to a driving scene model to determine whether the manual driving maneuver is acceptable or unacceptable based on the acquired driving data. Responsive to determining that the manual driving maneuver is unacceptable, feedback can be provided to a user. In some instances, the feedback can be active feedback or passive feedback. In some instance, the user can be the human driver of the vehicle, or some other person related to the driver in some manner.

16 Claims, 3 Drawing Sheets

(58) Field of Classification Search
CPC .............. G05D 1/0223; G06Q 10/0635; H04B 17/3913; B60W 30/12; B60W 10/20; B60W 10/04; B60W 10/18; B60W 10/22; B60W 10/30; B60W 2040/0827; B60W 2540/22; B60W 2540/26; B60W 2540/30; B60W 2710/202; B60W 2710/30; B60W 2750/30; B60W 2900/00; B60W 30/02; B60W 30/08; B60W 30/143; B60W 40/08; B60W 40/09; B60W 50/087; B60W 50/16; B60W 2050/0071; B60W 2420/42; B60W 30/16; B60W 50/14; B60W 2050/0008; B60W 2050/0037; B60W 2050/0073; B60W 2050/0075; B60W 2050/143; B60W 2050/146; B60W 2420/52; B60W 2510/20; B60W 2540/04; B60W 2550/20; B60W 2710/20; B60W 2710/207; B60W 50/10; B60W 50/12; B60W 2040/0818
See application file for complete search history.

(56) References Cited

U.S. PATENT DOCUMENTS

2012/0212353 A1* 8/2012 Fung ................ B60K 28/06
340/905
2017/0057492 A1* 3/2017 Edgington .......... B60K 28/066

* cited by examiner

ASSESSMENT OF HUMAN DRIVING PERFORMANCE USING AUTONOMOUS VEHICLES

FIELD

The subject matter described herein relates in general to vehicles and, more particularly, to the evaluation and/or development of driving skills for vehicle drivers.

BACKGROUND

Autonomous vehicles or highly automated vehicles can be configured to operate in a plurality of operational modes. An example of an operational mode is one in which a computing system is used to navigate and/or maneuver the vehicle along a travel route with minimal or no input from a human driver. Such vehicles are equipped with sensors that are configured to detect information about the surrounding environment, including the presence of objects in the environment. The detected information can be sent to the computing system. Other operational modes can include different levels of human input, including a manual mode in which a human driver navigates and/or maneuvers the vehicle through the surrounding environment. Such autonomous vehicles or highly automated vehicles can be configured to switch between the various operational modes.

SUMMARY

In one respect, the present disclosure is directed to a method of assessing human driving performance using an autonomous vehicle. The autonomous vehicle can have a manual operational mode and one or more autonomous operational modes. The method can include, while the autonomous vehicle is operating in the manual operational mode, acquiring driving data relating to a manual driving maneuver. The method can also include evaluating the acquired driving data relative to a driving scene model to determine whether the manual driving maneuver is acceptable or unacceptable. The method can further include, responsive to determining that the manual driving maneuver is unacceptable, providing feedback to a user.

In another respect, the present disclosure is directed to a system for assessing human driving performance using an autonomous vehicle. The autonomous vehicle can have a manual operational mode and one or more autonomous operational modes. The system can include one or more sensors. The one or more sensors can be configured to acquire driving data relating to a manual driving maneuver while the autonomous vehicle is operating in the manual operational mode. The system can also include a processor. The processor can be operatively connected to receive acquired driving data from the one or more sensors. The processor can be programmed to initiate executable operations. The executable operations can include evaluating the acquired driving data relative to a driving scene model to determine whether the manual driving maneuver is acceptable or unacceptable. The executable operations can also include, responsive to determining that the manual driving maneuver is unacceptable, providing feedback to a user.

DETAILED DESCRIPTION

A human driver's performance in operating an autonomous vehicle can be assessed using the autonomous vehicle. An autonomous vehicle can have a manual operational mode and one or more autonomous operational modes. While the autonomous vehicle is operating in the manual operational mode, driving data relating to a manual driving maneuver of the autonomous vehicle can be acquired. The acquired driving data can be evaluated relative to a driving scene model to determine whether the manual driving maneuver is acceptable or unacceptable. In determining whether the manual driving maneuver is acceptable or unacceptable, a predetermined standard can be used. The predetermined standard can be the same standard used to determine whether one or more potential autonomous driving maneuvers is acceptable or unacceptable when the autonomous vehicle is operating in an autonomous operational mode. Responsive to determining that the manual driving maneuver is unacceptable, feedback can be provided to a user. The present detailed description relates to methods and/or systems that incorporate one or more of such features. Arrangements described herein can be implemented using existing autonomous vehicle technology. Arrangements described herein can be used to evaluate the driving skills of human drivers and/or to give advice and/or training to increase a human driver's driving skills.

Figure 2:
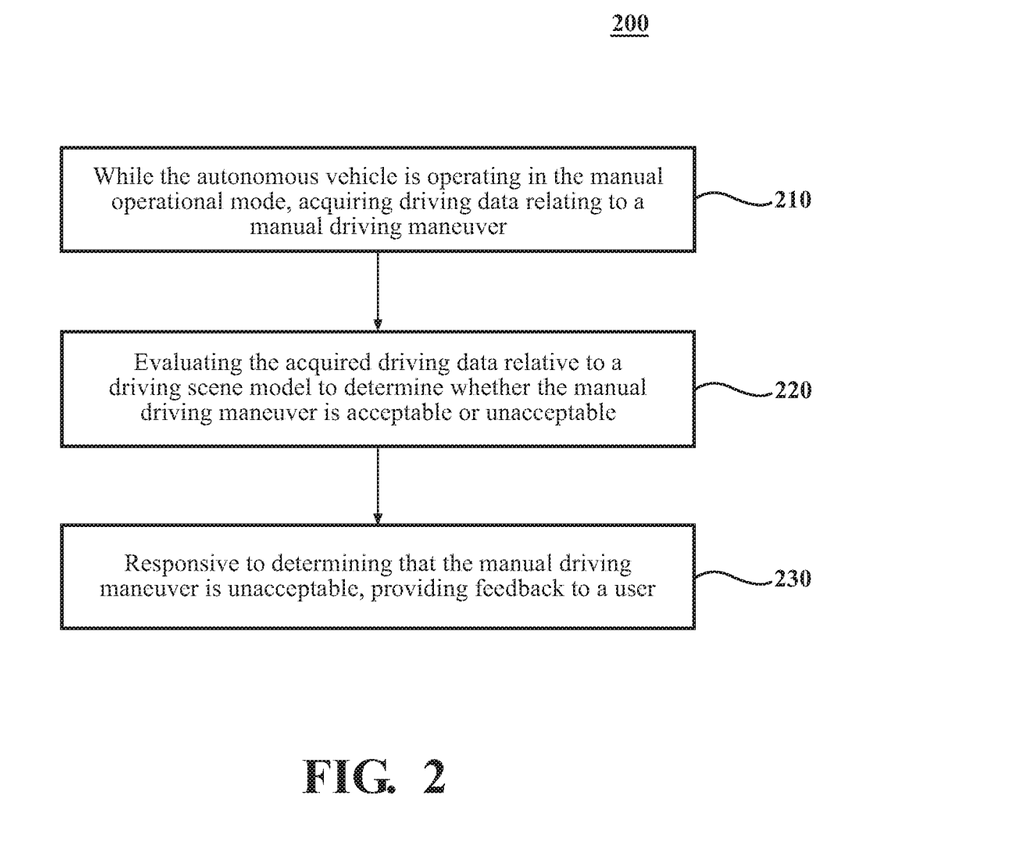
FIG. 2 is an example of a method of assessing a manual driving maneuver of the autonomous vehicle while the autonomous vehicle is operating in a manual operational mode.
Figure 3:
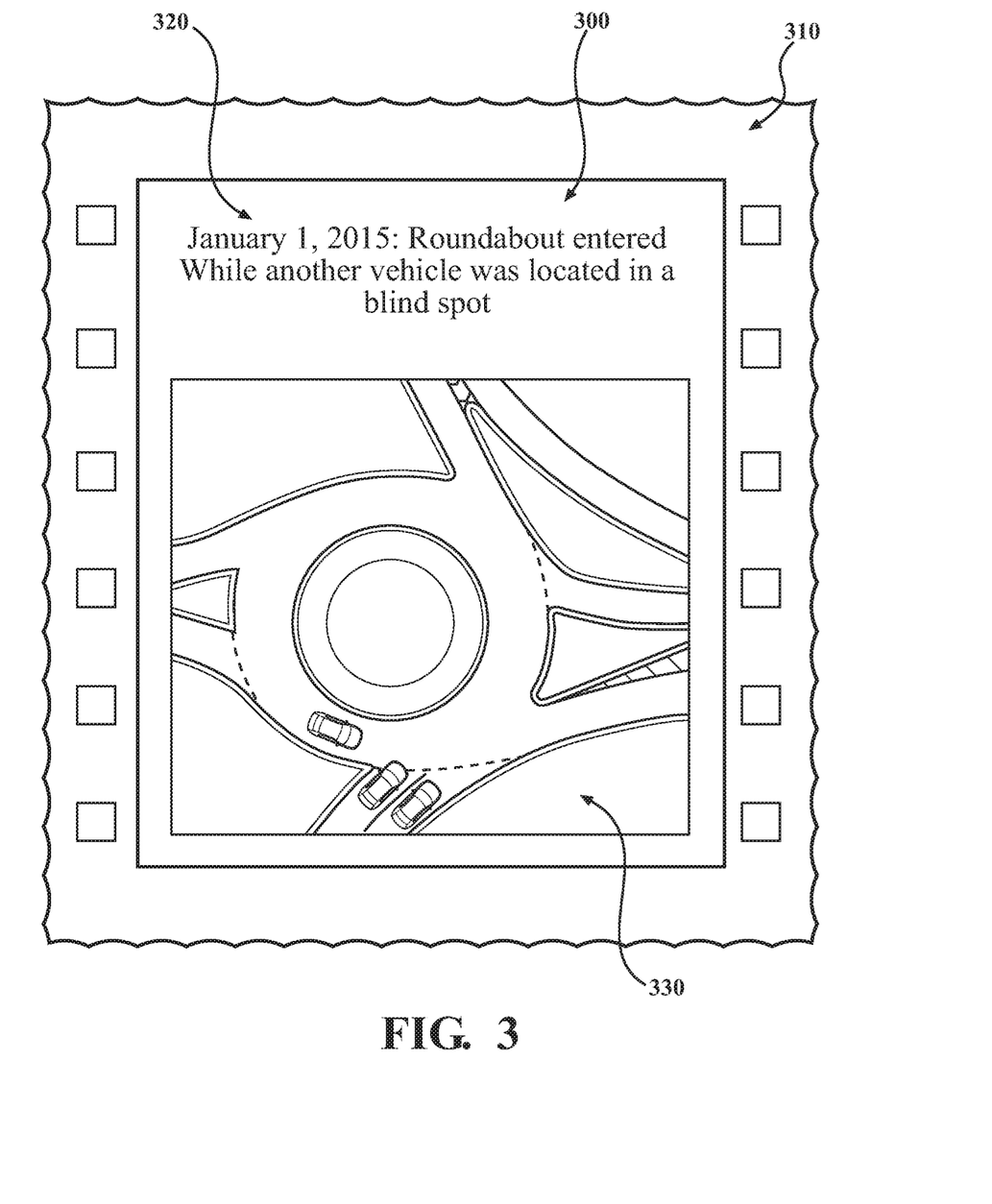
FIG. 3 is an example of feedback presented to a user regarding a manual driving maneuver of the autonomous vehicle while the autonomous vehicle is operating in a manual operational mode.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
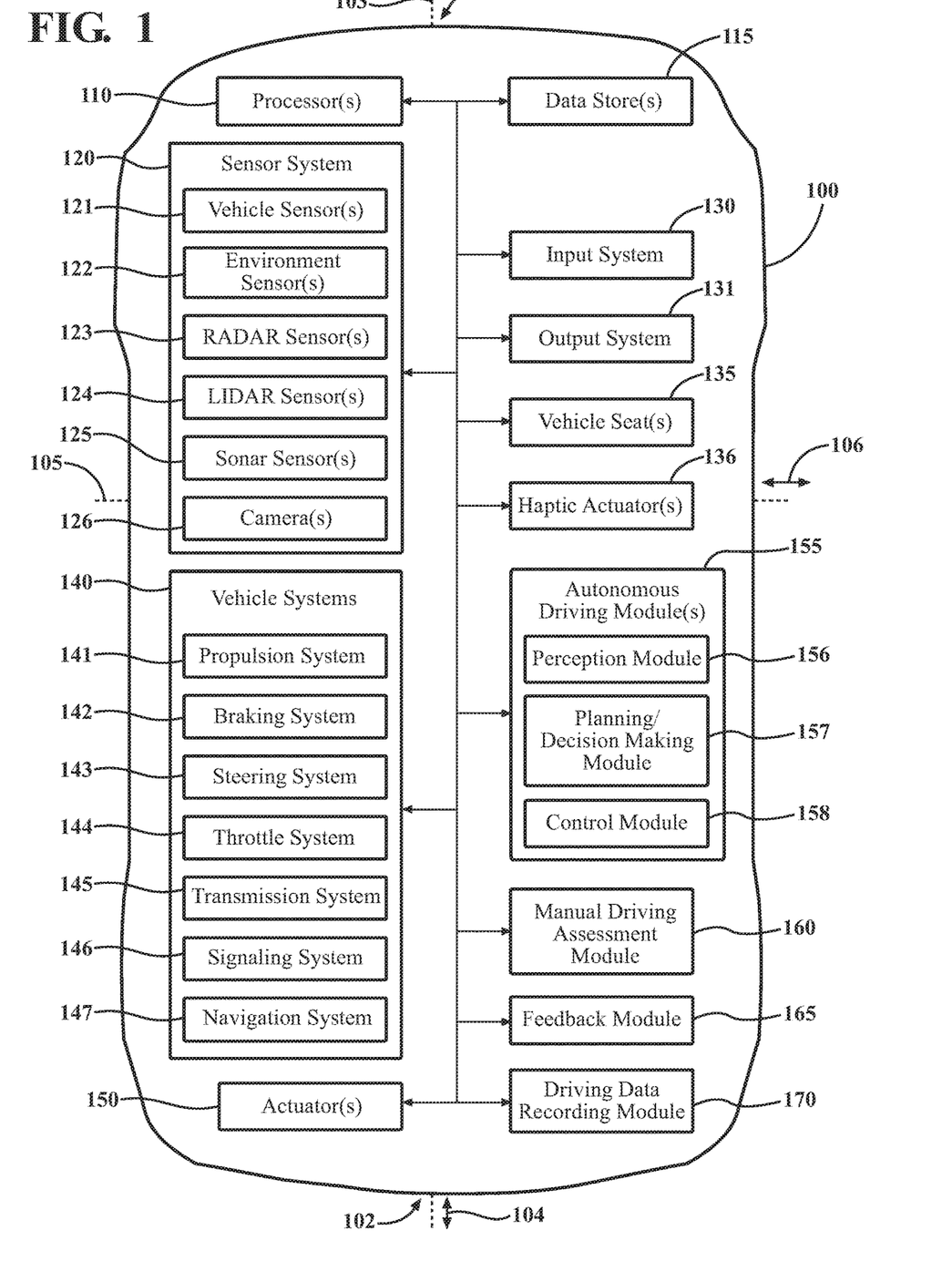
FIG. 1 is an example of an autonomous vehicle configured to assess a manual driving maneuver of the autonomous vehicle while the autonomous vehicle is operating in a manual operational mode.

Referring to FIG. 1, an example of an autonomous vehicle 100 is shown. As used herein, "vehicle" means any form of motorized transport. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the autonomous vehicle 100 can be highly automated.

In one or more implementations, the autonomous vehicle 100 can be an automobile. While arrangements will be described herein with respect to automobiles, it will be understood that embodiments are not limited to automobiles. In one or more implementations, the autonomous vehicle 100 may be a watercraft, an aircraft or any other form of motorized transport.

The autonomous vehicle 100 can have a plurality of operational modes. For instance, the autonomous vehicle 100 can have an unmonitored autonomous operational mode. "Unmonitored autonomous operational mode" means that one or more computing systems are used to navigate and/or maneuver the vehicle along a travel route with no input or supervision required from a human driver. As an example, the unmonitored autonomous operational mode can include Level 4 (L4), as defined by the National Highway Traffic Safety Administration in its Preliminary Statement of Policy Concerning Automated Vehicles (May 30, 2013) ("NHTSA 2013 Policy"), which is incorporated herein by reference. The autonomous vehicle 100 can have a monitored autonomous operational mode. "Monitored autonomous operational mode" means that one or more computing systems are used to navigate and/or maneuver the vehicle with at least some human driver supervision required. As an example, the monitored autonomous operational mode can include Level 3 or L3, as defined by the NHTSA 2013 Policy. In some instances, when the autonomous vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

The autonomous vehicle 100 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. As an example, the semi-autonomous operational mode can include Levels 2 (L2) and/or Level 1 (L1), as defined by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

The autonomous vehicle 100 can have a manual operational mode. "Manual operational mode" means that a substantial majority of or all of the navigation and/or maneuvering of the vehicle along a travel route is performed by a human driver with minimal or no input from a computing system. As an example, the manual operational mode can include Level 0 (L0), as defined by the NHTSA 2013 Policy.

The autonomous vehicle 100 can be configured to be switched between the various operational modes, including between an autonomous operational mode and a manual operational mode. Such switching can be implemented in any suitable manner, now known or later developed. The switching can be performed automatically, or it can be done responsive to receiving a manual input or request.

The autonomous vehicle 100 can have a front end 101 and a back end 102. The autonomous vehicle 100 can have an associated longitudinal axis 103, which can be the central axis of the autonomous vehicle 100. The autonomous vehicle 100 can have an associated longitudinal direction 104. "Longitudinal direction" means any direction that is substantially parallel to and/or co-linear with the longitudinal axis 103. The autonomous vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The autonomous vehicle 100 can have an associated lateral direction 106. "Lateral direction" means any direction that is substantially parallel to and/or co-linear with the lateral axis 105.

The autonomous vehicle 100 can include various elements, some of which may be a part of an autonomous driving system. Some of the possible elements of the autonomous vehicle 100 are shown in FIG. 1 and will now be described. It will be understood that it is not necessary for the autonomous vehicle 100 to have all of the elements shown in FIG. 1 or described herein. The autonomous vehicle 100 can have any combination of the various elements shown in FIG. 1. Further, the autonomous vehicle 100 can have additional elements to those shown in FIG. 1. In some arrangements, the autonomous vehicle 100 may not include one or more of the elements shown in FIG. 1. Further, while the various elements are shown as being located within the autonomous vehicle 100 in FIG. 1, it will be understood that one or more of these elements can be located external to the autonomous vehicle 100. Further, the elements shown may be physically separated by large distances.

The autonomous vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the autonomous vehicle 100. For instance, the processor 110 can be an engine control unit (ECU).

The autonomous vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

Non-limiting examples of various categories of data that can be stored in the one or more data stores 115 will now be described. In one or more arrangements, the one or more data stores 115 can include map data. The map data can include maps of one or more geographic areas. The map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360 degree ground views. The map data can include terrain data. The terrain data can include information about the terrain of one or more geographic areas. The terrain data can include elevation data in the one or more geographic areas. The map data can include a digital map with information about road geometry. The map data can be high quality and/or highly detailed.

In one or more arrangements, the one or more data stores 115 can include traffic rules data. The traffic rules data can include one or more traffic rules. As used herein, "traffic rule" is any law, rule, ordinance or authority that governs the operation of a motor vehicle, including motor vehicles in motion and motor vehicles that are parked or otherwise not in motion. The traffic rules data can be international, federal, national, state, city, township and/or local laws, rules, ordinances and/or authorities.

In one or more arrangements, the one or more data stores 115 can include one or more driving scene models. "Driving scene model" means any representation of at least a portion of an external environment of the vehicle based at least in part on acquired sensor system data of the at least a portion of the external environment of a vehicle. The driving scene model can be a virtual representation or a computer-generated representation of the at least a portion of the external environment of the vehicle. In some instances, a driving scene model can be generated in real-time. In some instances, at least a portion of the driving scene model can be pre-generated or otherwise based at least partially on preexisting data. The driving scene model can be of a geographic area. In one or more arrangements, the driving scene model can include one or more images and/or videos. The driving scene model can include representation of road(s), intersection(s), building(s), structure(s), traffic control device(s), lane marker(s), landmark(s), and/or feature(s), just to name a few possibilities. In one or more arrangements, the driving scene model can be based at least partially on and/or can at least partially include map data.

In some instances, at least a portion of the data (e.g., map data, traffic rules data, driving scene models, and/or other data) can be located in one or more data stores 115 located onboard the autonomous vehicle 100. Alternatively or in addition, at least a portion of the data can be located in a data store or source that is located remote from the autonomous vehicle 100. The data can be obtained by the autonomous vehicle 100 in any suitable manner, or it can be provided by an entity (e.g., a vehicle manufacturer) for use by the autonomous vehicle 100.

The autonomous vehicle 100 can include a sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the autonomous vehicle 100 (including any of the elements shown in FIG. 1). The sensor system 120 can acquire data of at least a portion of the external environment of the autonomous vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the autonomous vehicle 100 itself, including manual driving data. "Manual driving data" includes any data or information relating to the maneuvering, operation, and/or handling of an autonomous vehicle while the autonomous vehicle is being operated in the manual operational mode, including any action(s), conditions(s), setting(s), and/or movement(s) thereof, and/or any input(s) provided by a human driver. In one or more arrangements, the vehicle sensor(s) 121 can be configured to detect, determine, assess, monitor, measure, quantify and/or sense position and orientation changes of the autonomous vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the autonomous vehicle 100. In one or more arrangements, the vehicle sensor(s) 121 can include a speedometer (not shown). The speedometer can determine a current speed of the autonomous vehicle 100, or data acquired by the speedometer can be used to determine a current speed of the autonomous vehicle 100.

In one or more arrangements, the vehicle sensor(s) 121 can include one or more sensors configured to detect, determine, assess, monitor, measure, quantify, and/or sense a position of a steering wheel of the autonomous vehicle 100 (e.g., a rotation angle of the steering wheel), the speed for each individual wheel of the autonomous vehicle 100, the speed of the autonomous vehicle 100, a position of an accelerator pedal of the autonomous vehicle 100, and/or a position of a brake pedal of the autonomous vehicle 100, just to name a few possibilities Alternatively or in addition, the sensor system 120 can include one or more environment sensors 122 configured to acquire, detect, determine, assess, monitor, measure, quantify and/or sense driving environment data. "Driving environment data" includes and data or information about the external environment in which an autonomous vehicle is located or one or more portions thereof. For example, the one or more environment sensors 122 can be configured to detect, determine, assess, monitor, measure, quantify and/or sense objects in at least a portion of the external environment of the autonomous vehicle 100 and/or information/data about such objects. Such objects may be stationary objects and/or dynamic objects. The one or more environment sensors 122 can be configured to detect, determine, assess, monitor, measure, quantify and/or sense other things in the external environment of the autonomous vehicle 100, such as, for example, lane markers, signs, traffic lights, traffic signs, lane lines, crosswalks, curbs proximate the autonomous vehicle 100, off-road objects, etc. In one or more arrangements, the one or more environment sensors 122 can include a global navigation satellite system (GNSS), a global positioning system (GPS), a navigation system 147, and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect, determine, assess, monitor, measure, quantify and/or sense something using at least in part radio signals. The one or more radar sensors 123 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g. in the longitudinal direction 104, the lateral direction 106 and/or other direction(s)), the elevation of each detected object, the speed of each detected object and/or the movement of each detected object.

In one or more arrangements, the sensor system 120 can include one or more LIDAR sensors 124. "LIDAR sensor" means any device, component and/or system that can detect, determine, assess, monitor, measure, quantify and/or sense something using at least in part lasers. The LIDAR sensor can include a laser source and/or laser scanner configured to emit a laser signal and a detector configured to detect reflections of the laser signal. The one or more LIDAR sensors 124 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g. in the longitudinal direction 104, the lateral direction 106 and/or other direction(s)), the elevation of each detected object, the speed of each detected object, and/or the movement of each detected object.

In one or more arrangements, the sensor system 120 can include one or more sonar sensors 125. "Sonar sensor" means any device, component and/or system that can detect, determine, assess, monitor, measure, quantify and/or sense something using at least in part sound waves. The one or more sonar sensors 125 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g. in the longitudinal direction 104, the lateral direction 106 and/or other direction(s)), the elevation of each detected object, the speed of each detected object, and/or the movement of each detected object.

The sensor system 120 can include can include one or more cameras 126. "Camera" includes any device(s), component(s), and/or system(s) that is configured to capture visual data. "Visual data" includes video and/or image information/data. The visual data can be in any suitable form.

In one or more arrangements, one or more of the cameras 126 can be oriented, positioned, configured, operable, and/or arranged to capture visual data from at least a portion of the external environment of the autonomous vehicle 100. Visual data acquired by the one or more cameras 126 can be used to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions, the elevation of each detected object, the speed of each detected object, and/or the movement of each detected object.

The one or more cameras 126 can be high resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras.

In one or more arrangements, one or more of the cameras 126 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (color or monochrome). The image capture element may capture images in any suitable wavelength on the electromagnetic spectrum. The image capture element may capture color images and/or grayscale images. The one or more of the cameras 126 can be configured with zoom in and/or zoom out capabilities.

The one or more cameras 126 can be located in any suitable portion of the autonomous vehicle 100. For instance, one or more of the cameras 126 can be located within the autonomous vehicle 100. One or more of the cameras 126 can be located on the exterior of the autonomous vehicle 100. One or more of the cameras 126 can be located on or exposed to the exterior of the autonomous vehicle 100. As an example, the one or more cameras 126 can be located in a central region at or near the front end 101 of the autonomous vehicle 100. As another example, one or more cameras 126 can be located on the roof of the autonomous vehicle 100.

The position of one or more of the cameras 126 can be fixed such that its position does not change relative to the autonomous vehicle 100. One or more of the cameras 126 can be movable so that its position can change to allow visual data from different portions of the external environment of the autonomous vehicle 100 to be captured. The movement of the cameras 126 can be achieved in any suitable manner. For instance, the cameras 126 can be rotatable about one or more axes, pivotable, slidable, and/or extendable, just to name a few possibilities. In one or more arrangements, the cameras 126 can have any suitable range of motion, including, for example, substantially spherical, substantially hemi-spherical, substantially circular and/or substantially linear. The one or more cameras and/or the movement of the one or more cameras can be controlled by the sensor system 120, the processor 110 and/or any one or more of the modules described herein or other module.

The sensor system 120, the processor 110, and/or one or more other elements of the autonomous vehicle 100 can be operable to control movements of one or more of the sensors of the sensor system 120. It should be noted that any of the sensors described herein can be provided in any suitable location with respect to the autonomous vehicle 100. For instance, one or more sensors can be located within the autonomous vehicle 100, one or more sensors can be located on the exterior of the autonomous vehicle 100 and/or one or more sensors can be located so as to be exposed to the exterior of the autonomous vehicle 100.

Alternatively or in addition to one or more of the above examples, the sensor system 120 can include one or more sensors configured to detect, determine, assess, monitor, measure, quantify and/or sense the location of the autonomous vehicle 100 and/or the location of objects in the environment relative to the autonomous vehicle 100. Any suitable sensor can be used for such purposes. Such sensors may work independently and/or in combination with a positioning system of the autonomous vehicle 100.

The autonomous vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The autonomous vehicle 100 can include an output system 131. An "output system" is defined as any device, component, system, element or arrangement or groups thereof that enable information/data to be presented to a vehicle occupant (e.g. a person, a vehicle occupant, etc.). The output system 131 can present information/data to a vehicle occupant. The output system 131 can include a display, as described above. Alternatively or in addition, the output system 131 may include a microphone, earphone and/or speaker. Some components of the autonomous vehicle 100 may serve as both a component of the input system 130 and a component of the output system 131.

The autonomous vehicle 100 can include one or more vehicle seats 135. While arrangements described herein will be directed to the driver seat, it will be understood that arrangements described herein can apply, alternatively or in addition, to one or more passenger seats. The one or more vehicle seats 135 can have any suitable form. One or more of the vehicle seats 135 can be configured to be movable in a plurality of directions and/or in a plurality of different manner. In one or more arrangements, a portion of one or more vehicle seats 135 can be movable.

In one or more arrangements, one or more portions (e.g., a seat portion, a back portion, an arm rest, a head rest) of at least one of the vehicle seats 135 can be configured to provide a haptic indication (e.g., at least a portion of the vehicle seat 135 can vibrate). To that end, the autonomous vehicle 100 can include one or more haptic actuators 136. The one or more haptic actuators 136 can be operatively connected to one or more of the vehicle seats 135. The haptic actuators 136 can be any element or combination of elements configured to cause the vehicle seat 135 to provide a haptic indication responsive to receiving signals or other inputs from the processor 110 and/or other module or element of the autonomous vehicle 100. The processor 110 can be operatively connected to the haptic actuators 136. Any suitable actuator can be used. For instance, the one or more haptic actuators 136 can include motors, pneumatic actuators, hydraulic pistons, relays, solenoids, and/or piezoelectric actuators, just to name a few possibilities.

In one or more arrangements, only one of the vehicle seats 135, such as the driver's seat, may be configured to provide a haptic indication. In one or more arrangements, a plurality of the vehicle seats 135 may be configured to provide a haptic indication. In such case, the plurality of vehicle seats 135 can be configured to provide the same haptic indication. Alternatively, the plurality of vehicle seats 135 can be configured to provide different haptic indications. The plurality of vehicle seats 135 can be controlled individually or collectively to provide the haptic indications.

The autonomous vehicle 100 can include one or more vehicle systems 140. Various examples of the one or more vehicle systems 140 are shown in FIG. 1. However, the autonomous vehicle 100 can include more, fewer or different systems. It should be appreciated that although particular vehicle systems are separately defined, each or any of the systems or portions thereof may be otherwise combined or segregated via hardware and/or software within the autonomous vehicle 100. The autonomous vehicle 100 can include a propulsion system 141, a braking system 142, a steering system 143, a throttle system 144, a transmission system 145, a signaling system 146, and/or a navigation system 147. Each of these systems can include one or more mechanisms, devices, elements, components, systems, and/or combination thereof, now known or later developed.

The navigation system 147 can include one or more mechanisms, devices, elements, components, systems, applications and/or combinations thereof, now known or later developed, configured to determine the geographic location of the autonomous vehicle 100 and/or to determine a travel route for the autonomous vehicle 100.

The navigation system 147 can include one or more mapping applications to determine a travel route for the autonomous vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 147 can be configured to update the travel route dynamically while the autonomous vehicle 100 is in operation.

The navigation system 147 can include a global positioning system, a local positioning system or a geolocation system. The navigation system 147 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 147 can use Transmission Control Protocol (TCP) and/or a Geographic information system (GIS) and location services.

The navigation system 147 may include a transceiver configured to estimate a position of the autonomous vehicle 100 with respect to the Earth. For example, navigation system 147 can include a GPS transceiver to determine the latitude, longitude and/or altitude of the autonomous vehicle 100. The navigation system 147 can use other systems (e.g. laser-based localization systems, inertial-aided GPS, and/or camera-based localization) to determine the location of the autonomous vehicle 100.

Alternatively or in addition, the navigation system 147 can be based on access point geolocation services, such as using the W3C Geolocation Application Programming Interface (API). With such a system, the location of the autonomous vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the autonomous vehicle 100 is determined will depend on the manner of operation of the particular location tracking system used.

The autonomous vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or other module or element of the autonomous vehicle 100 (e.g., autonomous driving module 155). Any suitable actuator can be used. For instance, the one or more actuators 150 can include motors, pneumatic actuators, hydraulic pistons, relays, solenoids, and/or piezoelectric actuators, just to name a few possibilities.

The autonomous vehicle 100 can include various modules, at least some of which will be described herein. The modules can be implemented as computer readable program code that, when executed by a processor, implement one or more of the various processes described herein. One or more of the modules can be a component of the processor 110, or one or more of the modules can be executed on and/or distributed among other processing systems to which the processor 110 is operatively connected. The modules can include instructions (e.g., program logic) executable by one or more processor 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The autonomous vehicle 100 can include an autonomous driving module 155. The autonomous driving module 155 can be configured to perform various functions, some of which will be described herein. The autonomous driving module 155 can include one or more sub-modules. For instance, the autonomous driving module 155 can include a perception module 156, a planning/decision-making module 157, and/or a control module 158. Each of these sub-modules of the autonomous driving module 155 will be described in turn below.

The perception module 156 can receive data from the sensor system 120 and/or any other type of system capable of capturing information relating to the autonomous vehicle 100 and/or the external environment of the autonomous vehicle 100. In one or more arrangements, the perception module 156 can use such data to generate one or more driving scene models. The driving scene model can include information specific to both stationary and moving objects such as traffic signs, natural objects, moving vehicles, pedestrians, or other localized position data and/or signals, and output corresponding data and/or signals to the processor 110. The perception module 156 can determine vehicle position and velocity data. The perception module 156 can determine the location of obstacles, objects, or other environmental features including traffic signs, trees, shrubs, neighboring vehicles, pedestrians, etc. One or more of the vehicle systems 140 can be operatively connected to the perception module 156. The perception system 152 can be configured to receive, capture, and/or determine data indicative of performance of the vehicle systems 140.

The perception module 156 can be configured to receive, capture, and/or determine location information for objects within the environment surrounding the autonomous vehicle 100 for use by the processor 110, and/or one or more of the modules described herein to estimate position and orientation of the autonomous vehicle 100, images for processing by an image sensor, vehicle position in global coordinates based on signals from a plurality of satellites, or any other data and/or signals that could be used to determine the current state of the autonomous vehicle 100 or determine the position of the autonomous vehicle 100 in respect to its environment for use in either creating a map format or determining the position of the autonomous vehicle 100 in respect to the map format.

Driving scene models can be generated using any suitable technique, now known or later developed. For instance, driving scene models can be generated using location-based geographic features captured by the autonomous vehicle 100 for road-based objects such as traffic lights, traffic signs, lane lines, crosswalks, and curbs proximate to the autonomous vehicle 100 as it travels along a travel route. Information representing these geographic features can be captured by, for example, using the sensor system 120 in combination with an algorithm such as a random sample consensus (RANSAC) to differentiate lines, record the position of the autonomous vehicle 100, and collect data on position from a GNSS and/or an IMU. The captured information for these geographic features can then be manipulated using a simultaneous localization and mapping (SLAM) technique to position all of the geographic features in relation to the position of the autonomous vehicle 100.

Alternatively, driving scene models can be constructed using overhead images (e.g. satellite images) of geographic features traced by a map editor that allows selection of different categories for each geographic feature, for example, traffic sign, road marking, etc. Any driving scene model used and/or generated by the autonomous vehicle 100 can be stored, for example, in the data stores 115. A driving scene model can be constructed using location information for geographic features that are able to be ignored during moving object detection and tracking processes performed by the autonomous vehicle 100 for decision making while traveling a planned vehicle path. This group of geographic features, that is, background objects, can include stationary road-based objects, or road features, such as traffic signs, guardrails, berms, etc., and mostly stationary natural objects such as trees, shrubs, or bushes that can produce foliage.

In one or more arrangements, the perception module 156 can be configured to validate an existing driving scene model (e.g., a driving scene model that is acquired by the autonomous vehicle 100 from any suitable source or that is already stored in the data store(s) 115). For instance, driving environment data acquired by the sensor system 120 can be compared to an existing driving scene model. If there is a sufficient amount of commonality between the acquired driving environment data and the existing driving scene model, then the existing driving scene model can be validated and used for any suitable purpose, including any of those described herein. If there is an insufficient amount of commonality between the acquired driving environment data and the existing driving scene model, then the existing driving scene model can be considered suspect. In such case, the existing driving scene model can be ignored or deleted. Alternatively, the existing driving scene model can be updated based on the driving environment data acquired by the sensor system 120. Alternatively, a new driving scene model can be generated based at least in part on the driving environment data acquired by the sensor system 120.

The planning/decision-making module 157 can be configured to determine path(s), current autonomous driving maneuvers for the autonomous vehicle 100, future autonomous driving maneuvers and/or modifications to current autonomous driving maneuvers based on data acquired by the sensor system 120, driving scene models generated by the perception module 156, and/or data from any other suitable source. In some arrangements, the planning/decision-making module 157 can determine one or more potential autonomous driving maneuvers for the autonomous vehicle 100 at any point in time. "Driving maneuver" means one or more actions that affect the movement of a vehicle. Examples of driving maneuvers include: accelerating, braking, turning, moving in a lateral direction of the autonomous vehicle 100, changing travel lanes, merging into a travel lane, and/or reversing, just to name a few possibilities. "Autonomous driving maneuver" is a driving maneuver determined by an autonomous vehicle.

The planning/decision-making module 157 can be configured to assess the one or more potential autonomous driving maneuvers for the autonomous vehicle 100. The one or more potential autonomous driving maneuvers can be assessed in any suitable manner, some examples of which will be described in turn below. For instance, the one or more potential autonomous driving maneuvers can be evaluated relative to a driving scene model. Such evaluation can be used to determine whether the one or more potential autonomous driving maneuvers is acceptable or unacceptable.

In one or more arrangements, the evaluation of the one or more potential autonomous driving maneuvers can include scoring the one or more potential autonomous driving maneuvers relative to the driving scene model. The one or more potential autonomous driving maneuvers can be scored according to a predetermined standard. The predetermined standard can be a predetermined scoring standard. The scoring standard can be any scoring standard, now known or later developed. In one or more arrangements, the predetermined scoring standard can include any suitable parameter(s). As an example, if the potential path or driving maneuver will result is the autonomous vehicle 100 passing within a predetermined distance from another object, then the score may be lowered.

Further, the nature or identity of the object in the external environment can affect the predetermined distance and, thus, the scoring. For instance, the predetermined distance may be larger for some objects compared to the predetermined distance for other objects. For instance, the predetermined distance may be relatively larger for living objects (e.g., pedestrians, construction workers, animals, etc.), objects containing human occupants (e.g., bicyclists, motorcyclists, and/or other vehicles), and/or objects that would cause significant damage to the autonomous vehicle or its occupants. The predetermined distance may be relatively smaller for objects that would not cause significant damage to the autonomous vehicle and/or its occupants (e.g., curbs, medians, etc.).

In some instances, the scoring can be affected by the amount which the autonomous vehicle 100 stays within a current travel lane. In some instances, the scoring can be affected by the degree to which the autonomous vehicle 100 is centered in a current travel lane. In some instances, the scoring can be affected by whether or not the potential driving maneuver is in compliance with one or more traffic rules.

One of the potential autonomous driving maneuvers can be selected for implementation by the autonomous vehicle 100. The selection can be performed in any suitable manner. For example, in one or more arrangements, the potential autonomous driving maneuver with the highest score (or the acceptable can be selected for implementation.

In some instances, the planning/decision-making module 157 can further determine whether the one or more potential autonomous driving maneuvers are acceptable or unacceptable. The determination of whether a potential autonomous driving maneuver is acceptable or unacceptable can be performed in any suitable manner. For instance, if the score is above a predetermined threshold value, then the potential autonomous driving maneuver can be determined to be acceptable. If the score is below a predetermined threshold value, then the potential path or autonomous driving maneuver can be determined to be unacceptable. If the score is equal to the predetermined threshold value, then the potential autonomous driving maneuver can be determined to be either acceptable or unacceptable, depending on the configuration of the planning/decision-making module 157.

The potential autonomous driving maneuver(s) with a score that is unacceptable can be ignored or otherwise filtered. As for the potential driving maneuvers with scores that are acceptable, one of the potential autonomous driving maneuvers can be selected for implementation by the autonomous vehicle 100 in any suitable manner. For example, in one or more arrangements, the acceptable potential autonomous driving maneuver with the highest score can be selected. In some instances, one of the acceptable potential autonomous driving maneuvers can be selected randomly or according to a predetermined parameter.

The control module 158 can be configured can be configured to implement the selected one of the potential autonomous driving maneuvers. The control module 158 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The control module 158 can be configured to execute various vehicle functions and/or to transmit data to, receive data from, interact with, and/or control the autonomous vehicle 100 or one or more systems thereof (e.g. one or more of vehicle systems 140).

The processor 110 and/or the control module 158 can be operatively connected to communicate with the vehicle systems 140 and/or individual components thereof. For example, returning to FIG. 1, the processor 110 and/or the control module 158 can be in communication to send and/or receive information from one or more of the vehicle systems 140 to control the movement, speed, steering, accelerating, braking, maneuvering, heading, direction, etc. of autonomous vehicle 100. The processor 110 and/or the control module 158 may control some or all of these vehicle systems 140.

The processor 110 and/or the control module 158 may be operable to control the navigation and/or maneuvering of the autonomous vehicle 100 by controlling one or more of the vehicle systems 140 and/or components thereof. For instance, when operating in an autonomous mode, the processor 110 and/or the control module 158 can control the direction and/or speed of the autonomous vehicle 100. The processor 110 and/or the control module 158 can cause the autonomous vehicle 100 to accelerate (e.g., by increasing the supply of fuel provided to the engine), decelerate (e.g., by decreasing the supply of fuel to the engine and/or by applying brakes) and/or change direction (e.g., by turning the steering wheel).

The autonomous vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or the control module 158. Any suitable actuator can be used. For instance, the one or more actuators 150 can include motors, pneumatic actuators, hydraulic pistons, relays, solenoids, and/or piezoelectric actuators, just to name a few possibilities.

The autonomous vehicle 100 can include a manual driving assessment module 160. The manual driving assessment module 160 can be configured to assess manual driving maneuvers of the human driver. The manual driving maneuvers can be defined by manual driving data. At least a portion of the manual driving data can be acquired by the sensor system 120.

Any suitable type of manual driving data can be analyzed by the manual driving assessment module 160. For instance, the manual driving data can be actual driving data and/or predicted driving data. For instance, the actual driving data can be any driving data acquired at a current moment of time and within a predetermined amount of time prior to the current moment of time. As an example, the actual driving data can be any driving data acquired at a current moment of time and within about 10 seconds or less, about 5 seconds or less, about 4 seconds or less, about 3 seconds or less, about 2 seconds or less, or about 1 second or less thereof. The actual driving data can include any data acquired by the sensor system 120 of the autonomous vehicle 100.

In some instances, the manual driving data can include predicted driving data. The predicted driving data can be acquired in any suitable manner. For instance, the manual driving assessment module 160 can predict driving data based on one or more parameters. For instance, the predicted driving data can be based on the current steering wheel position, the brake pedal position, the accelerator pedal position, and/or the current vehicle speed, just to name a few possibilities. The predicted driving data can be for a period of time in the future from the current moment in time. In one or more arrangements, the period of time can be a predetermined period of time (e.g., about 5 seconds or less, about 4 seconds or less, about 3 seconds or less, about 2 seconds or less, or about 1 second or less). In one or more arrangements, the period of time can be a maximum amount of time permitted by the available data from the sensor system 120. The predicted driving data can be determined, in at least some instances, by using driving scenes generated by the perception module 156.

In one or more arrangements, the manual driving data can include any combination of actual driving data and predicted driving data. As an example, the manual driving data can include actual driving data for about 3 seconds or less before and including the present moment in time, and the determination can include predicted driving data for about 2 seconds or less in the future.

The manual driving assessment module 160 can be configured to assess the manual driving data in any suitable manner. The manual driving assessment module 160 can assess the acquired manual driving data in any suitable manner. For example, the manual driving assessment module 160 can assess the manual driving data in the same or substantially the same manner in which the planning/decision-making module 157 assesses potential autonomous driving maneuvers during an autonomous operational mode of the autonomous vehicle 100. Thus, in one or more arrangements, the manual driving assessment module 160 can evaluate the acquired manual driving data relative to a driving scene model. The evaluation can be used to determine whether the manual driving maneuver is acceptable or unacceptable. For example, the manual driving assessment module 160 can assign a score to the manual driving data. The above discussion of the evaluation of potential autonomous driving maneuvers by the planning/decision-making module 157 is equally applicable to the evaluation of manual driving maneuvers.

In one or more arrangements, the manual driving assessment module 160 can use and/or access the planning/decision-making module 157. In one or more arrangements, the manual driving assessment module 160 can include substantially instructions or program logic as planning/decision-making module 157. In one or more arrangements, the manual driving assessment module 160 and the planning/decision-making module 157 can be the same module. Thus, it will be appreciated that the arrangements described herein can be used in connection with autonomous vehicle technology. It should be noted that, even if the human driver's manual operation of the autonomous vehicle is assigned a low score and/or is determined to be unacceptable, the human driver can still allowed to operate the autonomous vehicle 100.

In some instances, the human driver's manual operation of the autonomous vehicle 100 can be assessed on its own without reference to potential autonomous driving maneuver(s) that the autonomous vehicle 100. In some instances, the human driver's manual operation of the autonomous vehicle 100 can be assessed with respect to an autonomous driving maneuver of the autonomous vehicle 100 that would have been selected by the planning/decision-making module 157 if the autonomous vehicle 100 was operating in an autonomous operational mode. It should be noted that, even if a human driver selects a manual driving maneuver that is different from a driving maneuver that the autonomous driving module 155 would select, it does not mean that the manual driving maneuver will receive a poor or unacceptable score. Indeed, the manual driving maneuver may receive a favorable or acceptable score despite being a different driving maneuver than would otherwise be selected by the autonomous driving module 155.

In one or more arrangements, the planning/decision-making module 157 and/or the manual driving assessment module 160 can be configured to analyze the manual driving data to identify wrong perceptions by the human driver. For instance, the planning/decision-making module 157 and/or the manual driving assessment module 160 can be configured to identify instances in which the human driver initiated a lane change when there was another vehicle located in a blind spot of the autonomous vehicle 100. From such manual driving data, the planning/decision-making module 157 and/or the manual driving assessment module 160 can determine that the driver did not check his or her blind spot prior to changing lanes.

The autonomous vehicle 100 can include a feedback module 165. The feedback module 165 can be configured to provide feedback to one or more users. "Feedback" means data, information, comments, notes and/or suggestions relating to a human driver's manual operation of a vehicle. Various examples of these types of feedback that can be provided by the feedback module 165 will now be described.

In one or more arrangements, the feedback can be active feedback. As used herein, "active feedback" means feedback that is provided to a human driver in real-time and/or while the autonomous vehicle is in operation. Various examples of active feedback will now be described.

Active feedback can include implementing one or more corrective actions. The corrective action(s) can be implemented automatically by the autonomous vehicle 100. The corrective action can include any change in movement of the autonomous vehicle 100, such as a turn of the steering wheel position, activating or increasing braking, deactivating or decreasing braking, activating or increasing acceleration, deactivating or decreasing acceleration, and/or a movement in the lateral direction 106, just to name a few possibilities. In some instances, the corrective action can be suggestive of a manual driving maneuver that the human driver should implement. In such case, the operation of the autonomous vehicle 100 is not altered by the autonomous vehicle 100.

However, in some instances, the corrective action can be more pronounced. For example, the corrective action may override or alter any manual driving inputs received from the human driver. Such an override or alteration may be implemented to avoid a collision with another object or to avoid a hazardous condition. In some instances, the corrective action can be based on a potential driving maneuver that would be selected by the planning/decision-making module 157.

As another example, active feedback can include the autonomous vehicle 100 providing haptic feedback to a human driver. Any suitable haptic feedback can be provided. For instance, the vehicle seat 135 (or a portion thereof) can be caused to vibrate. In one or more arrangements, the feedback module 165 can send a control signal to one or more haptic actuators 136 associated with the vehicle seat 135 to cause the vehicle seat 135 (or a portion thereof) to vibrate. It will be understood that vibration of vehicle seat 135 (or a portion thereof) is merely one example of a type of haptic feedback that can be implemented. The haptic feedback can be provided in any suitable situation. For instance, if the manual driving data is indicative of the human driver falling asleep or implementing a hazardous driving maneuver or an unusual driving maneuver, then haptic feedback can be provided to the human driver.

In one or more arrangements, active feedback can include directional feedback. The directional feedback can be any indication be to a human driver of a direction in which the human driver should navigate the vehicle and/or a direction in the external environment in which the human driver should pay attention to. As one example, the directional feedback may include illuminating a light on a side view mirror of the autonomous vehicle 100 (e.g., the left or right side view mirror). In some instances, the light may provide a flashing output to further draw the human driver's attention. The illumination of the light can signal to the human driver that he or she should pay attention to that side of the autonomous vehicle 100 or that he or she should maneuver the autonomous vehicle 100 in that direction.

It will be appreciated that the active feedback can allow drivers to make mistakes while learning how to improve his or her driving skills. Further, the activate feedback can help to limit or avoid collisions and/or accidents by taking control when a manual driving maneuver is assigned a poor score or assessment.

In one or more arrangements, the feedback can be passive feedback, which can be provided alternatively or in addition to active feedback. As used herein, "passive feedback" means feedback that is provided after vehicle operation has stopped or a period of time after a driving maneuver has been completed.

The passive feedback can be provided to one or more persons. For instance, the passive feedback can be provided to the driver of the autonomous vehicle 100. Alternatively or in addition, the passive feedback can be provided to a person who is not the driver of the autonomous vehicle 100. In such case, the person may be related to and/or responsible for the driver of the vehicle. In one example, if the driver is a new driver (e.g., a teenager), the passive feedback can be provided to at least one of the parents of the driver. In such case, the parent(s) can review the feedback to become aware of driving decisions of the driver. The parent(s) can review the driving decisions with the driver. In another example, if the driver is an elderly person, the passive feedback can be provided to a family member of the driver or a caregiver. In such case, the family member or caregiver can review the passive feedback to ensure that good driving decisions are being made.

The feedback module 165 can present the passive feedback or cause the passive feedback to be presented to one or more persons in any suitable manner. For instance, the feedback module 165 can be configured to send passive feedback to the one or more persons via a text message, email message, electronic file, or paper report. In one or more arrangements, the feedback module 165 can alert one or more persons at to the location of the passive feedback so that it may be accessed by a person. The feedback module 165 can include or have access to contact information for the one or more persons.

The passive feedback can present any suitable information. For instance, the passive feedback can present at least some of the instances in which a manual driving maneuver was assigned a poor score by the manual driving assessment module 160 and/or in which a manual driving maneuver was determined to be unacceptable. In one or more arrangements, the passive feedback can present visual data acquired by the sensor system 120. In one or more arrangements, the passive feedback can present scene models generated by the perception module 156 and/or the autonomous driving module 155. In one or more arrangements, the passive feedback can present the scores assigned to the manual driving maneuver. The passive feedback can allow for later review and training of the human driver.

The autonomous vehicle 100 can include a driving data recording module 170. The driving data recording module 170 can be configured to record driving data acquired by one or more sensors of the sensor system 120 and/or driving scenes generated by the autonomous driving module 155. The driving data recording module 170 can record such data for one or more portions of a trip or for the entire trip. The driving data recording module 170 can be configured to match data from the sensor system 120 with data/information from the navigation system 147, driving scenes, and/or map data. The driving data recording module 170 can be configured to record data automatically upon the occurrence of a predetermined event (e.g., a negative score of the or in response to receiving a user input or command. The driving data recorded by the driving data recording module 170 can be stored in any suitable location, such as one or more of the data stores 115.

Now that the various potential systems, devices, elements and/or components of the autonomous vehicle 100 have been described, various methods will now be described. Referring now to FIG. 2, an example of a method of assessing human driving performance using an autonomous vehicle is shown. The method 200 will be described in connection with the autonomous vehicle 100. The autonomous vehicle 200 has a manual operational mode and one or more autonomous operational modes. However, it will be understood that arrangements described herein are not limited in this respect.

Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, while the autonomous vehicle 100 is operating in the manual operational mode, driving data relating to one or more manual driving maneuvers (e.g., a human driver's execution of one or more driving maneuvers) can be acquired. The driving data can be acquired by the sensor system 120, such as by one or more vehicle sensors 121 thereof. The driving data can include data relating to one or more characteristics of the autonomous vehicle 100 (e.g., steering wheel position, brake pedal position, accelerator pedal position, wheel speed, any manual inputs provided by the human driver, etc.). The driving data can include current, past, and/or predicted driving maneuvers of the autonomous vehicle 100. The driving data can be acquired continuously, periodically, irregularly, or even randomly. The method can continue to block 220.

At block 220, the acquired driving data can be evaluated relative to a driving scene model. Such evaluating can include comparing past, current, and/or predicted manual driving maneuver(s) of the autonomous vehicle 100 to a driving scene model. Based on such evaluating, it can be determined whether the manual driving maneuver is acceptable or unacceptable.

Such a determination can be made by the processor 110 and/or the manual driving assessment module 160. Such a determination can be made continuously, periodically, irregularly, or even randomly. Such a determination can be made in real-time. The determination can be made in any suitable manner. The determination can be made relative to a predetermined standard. As an example, in one or more arrangements, the predetermined standard can be the same standard that is used to determine whether a potential autonomous driving maneuver is acceptable or unacceptable when the autonomous vehicle 100 is operating in an autonomous operational mode. The method can continue to block 230.

It should be noted that the driving scene model that the acquired driving data is evaluated relative to can be any suitable driving scene model. In one or more arrangements, the driving scene model can be based at least partially on the acquired driving environment data. In one or more arrangements, the driving scene model can be based entirely on acquired driving environment data. In one or more arrangements, the driving scene model can be generated in real-time. The driving scene model can be generated using any suitable technique, now known or later developed. In one or more arrangements, the driving scene model can be generated based entirely on real-time data of the external environment of the autonomous vehicle 100.

In one or more arrangements, the driving scene model can be based on a combination of predetermined driving environment data (e.g., map data, a previously generated driving scene model, traffic rules data, etc.) and driving environment data acquired in real-time, such as by the sensor system 120. In one or more arrangements, the driving scene model can be based entirely on predetermined driving environment data. For instance, the driving scene model can be a preexisting driving scene model. As an example, the driving scene model that was previously generated for the current external environment of the autonomous vehicle 100. Such a driving scene model may have been previously generated by the autonomous vehicle 100 or some other entity.

At block 230, responsive to determining that the manual driving maneuver is unacceptable, feedback can be provided to a user (e.g., the human driver of the autonomous vehicle 100 or some other person). In one or more arrangements, the feedback can be provided to the user by the feedback module 165. The feedback can be provided in real-time and/or at a subsequent time. As noted above, the feedback can be active feedback and/or passive feedback.

The method 200 can end. Alternatively, the method 200 can return to block 210 or some other block. As a further alternative, the method 200 can include additional and/or alternative blocks (not shown). In one or more arrangements, the method 200 can end if the autonomous vehicle 100 is switched to an autonomous operational mode.

A non-limiting example of passive feedback being presented to a user regarding a human driver's maneuvering of the autonomous vehicle while the autonomous vehicle is operating in a manual operational mode.

Driving data can be collected by the sensor system 120 while the autonomous vehicle 100 is being driven along a travel path and in the manual operational mode. The driving data can relate to a human driver's maneuvering of the autonomous vehicle 100, including the execution of one or more driving maneuvers. The driving data can be recorded for later use and/or analysis. In one or more arrangements, the driving data can be stored in one or more data stores 115.

The driving data can be analyzed by the manual driving assessment module 160 and/or the processor(s) 110. The manual driving assessment module 160/or the processor(s) 110 can be located onboard the autonomous vehicle 100 or remote from the autonomous vehicle 100. The manual driving assessment module 160 and/or the processor(s) 110 can determine whether the human driver's maneuvering of the autonomous vehicle 100 is acceptable or unacceptable. For example, the acquired manual driving data can be evaluated relative to a driving scene model, which can be a preexisting driving scene model and/or a driving scene model generated based on driving environment data acquired by the sensor system 120. Such a determination can be performed at any time while the autonomous vehicle 100 is in operation. In one or more arrangements, the determination can be made substantially continuously. In one or more arrangements, the determination can be performed a plurality of times in one second.

If it is determined that the human driver's execution of the driving maneuver is unacceptable, then the feedback module 165 and/or the processor(s) 110 can provide feedback relating to the human driver' execution of the driving maneuver. The feedback module 1365 and/or the processor(s) 110 can present feedback 300 to a user or can cause the feedback 300 to be presented to the user. The feedback 300 can be presented in any suitable manner. For instance, in one or more arrangements, the feedback 300 can be presented audibly and/or visually. FIG. 3 shows one example in which the feedback 300 is presented visually on a display 310. The feedback 300 can have any suitable form, content and features. Thus, it will be understood that the feedback 300 shown in FIG. 3 is provided merely as an example and is not intended to be limiting.

The display 310 can be any suitable type of display. In one or more arrangements, the display 310 can be a part of the output system 131 and/or the input system 130 of the autonomous vehicle 100. In some arrangements, the display 310 can be a portion of another vehicle system, such as a navigation system, a vehicle radio or audio system, a backup camera display and/or other vehicle monitor. In one or more arrangements, the display 310 can be included in a dashboard or instrument panel (not shown) of a vehicle. In one or more arrangements, the display 310 can be a display of a computing device, including a portable computing device of the driver of the autonomous vehicle 100 and/or some other person or entity.

The feedback 300 can have any suitable form and/or content. In one or more arrangements, the feedback 300 can include a textual portion 320 and a graphical portion 330. The textual portion 320 can present any suitable information in words. For instance, the textual portion 320 can explain the unacceptable driving maneuver implemented by the human driver. The textual portion 320 can include, for example, statistical information, historical information, and/or suggested corrective actions, just to name a few possibilities.

The graphical portion 330 can include a representation of the external environment at or around the time that the unacceptable driving maneuver was performed. The representation of the external environment an present graphical, photographic, video, satellite and/or map information or data, which can be obtained from one or more sources, including, for example, from the data store 115, the navigation system 147, and/or any other suitable source to which one or more elements of the autonomous vehicle 100 are operatively connected. Such source(s) may be located external to and/or remote from the autonomous vehicle 100.

The graphical portion 330 can include a representation of one or more objects detected in the external environment. As an example, in FIG. 3, a representation of other vehicles in the external environment can be included. The representation of the detected object(s) can be overlaid upon the representation of the external environment. The representation of the detected object(s) can be substantially accurately positioned relative to the representation of the external environment. In some instances, the representation of the detected object(s) can be moved so as to represent what occurred during this driving scene, according to data acquired by the sensors system 120. In one or more arrangements, the graphical portion 330 can present visual data acquired by the sensors system 120.

While FIG. 3 shows the feedback 300 as being presented visually on a display, it will be understood that arrangements are not limited in this regard. Indeed, the feedback 300 can be presented in other visual forms and/or in other non-visual forms. For instance, the feedback 300 can be presented visually on paper or on some other type of media. In one or more arrangements, the feedback 300 can be presented in an electronic file. Alternatively or in addition, the feedback 300 can be audibly presented to a user, such as over a speaker within the autonomous vehicle 100 or on a portable computing device.

Further, while FIG. 3 shows the feedback 300 as being directed to an instance in which the autonomous vehicle 100 entered a roundabout with another vehicle in its blind sport, arrangements are not limited in this respect. Indeed, the feedback 300 can be directed to any of various events that may occurred during the manual mode of operation. Examples of such events include: a manual driving maneuver was assigned a low score, a manual driving maneuver was determined to be unacceptable, the human driver had an incorrect perception of the external environment, driving over the speed limit, cutting off other drivers, failure to stop at a red light or a stop sign, changing travel lanes without signaling, traveling the wrong way on a road, violating a traffic law or rule, driving without headlights, etc.

Still further, FIG. 3 presents an example in which the feedback 300 is passive feedback. However, it will be understood that arrangements are not limited to the particular type of passive feedback shown. In addition, arrangements are not limited to providing passive feedback. Indeed, as an alternative or in addition, the feedback 300 can be active feedback.

It will be appreciated that arrangements described herein can provide numerous benefits, including one or more of the benefits mentioned herein. Arrangements described herein can provide useful assistance in the education and training of beginner drivers or drivers in training. As an example, arrangements described herein can provide useful feedback to a beginner driver and/or to the beginner driver's parent(s), relative(s), legal guardian(s), and/or instructor(s). Arrangements described herein can provide useful feedback about drivers who may require additional monitoring, such as drivers who are experiencing reduced cognitive processing or reduction in reaction time. As an example, arrangements described herein can provide useful feedback about the driving performance an elderly person to a caregiver. Arrangements described herein can be implemented using existing autonomous vehicle technology (e.g., existing sensing, perception, and/or decision-making technology) to evaluate the driving skills of human drivers and/or to give further advice and/or training to increase such skills. Arrangements described here can be helpful in analyzing driving decisions, including potential (human) perception failures and decision making failures. Arrangements described herein can improve safety in the operational of a vehicle in manual mode, including the safety of the driver and his or her passengers, as well as the safety of other drivers and/or pedestrians in the external environment.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of assessing human driving performance using an autonomous vehicle, the autonomous vehicle having a manual operational mode and one or more autonomous operational modes, the autonomous vehicle including one or more processors, when the autonomous vehicle is operating in the one or more autonomous operational modes, the one or more processors being configured to: determine one or more potential autonomous driving maneuvers for the autonomous vehicle; evaluate the one or more potential autonomous driving maneuvers relative to a predetermined standard to determine whether the one or more potential autonomous driving maneuvers are acceptable or unacceptable; and cause a selected one of the potential autonomous driving maneuvers to implemented, whereby the autonomous vehicle is navigated or maneuvered along a travel route, the method comprising:

while the autonomous vehicle is operating in the manual operational mode, acquiring in real-time, using one or more environment sensors located onboard the autonomous vehicle, driving environment data of at least a portion of an external environment of a vehicle;

generating, validating, or updating a driving scene model using the acquired driving environment data;

while the autonomous vehicle is operating in the manual operational mode, acquiring in real-time, using one or more sensors located onboard the autonomous vehicle, driving data relating to a manual driving maneuver;

evaluating, using the one or more processors, the acquired driving data relative to the driving scene model to determine whether the manual driving maneuver is acceptable or unacceptable based on a predetermined standard, the predetermined standard being the same standard used to determine whether one or more potential autonomous driving maneuvers is acceptable or unacceptable when the autonomous vehicle is operating in the one or more autonomous operational modes; and responsive to determining that the manual driving maneuver is unacceptable, providing feedback to a user via one or more vehicle components, the feedback including passive feedback, whereby the feedback is provided after operation of the autonomous vehicle has stopped or a period of time after the manual driving maneuver has been completed, and the feedback including visual, haptic, or audible feedback.

2. The method of claim 1, wherein the feedback further includes active feedback.

3. The method of claim 2, wherein the active feedback includes causing, using the one or more processors, the autonomous vehicle to automatically implement one or more corrective driving actions.

4. The method of claim 2, wherein the active feedback includes causing, using the one or more processors, the autonomous vehicle to automatically provide haptic feedback to a driver of the autonomous vehicle.

5. The method of claim 1, wherein providing feedback to the user includes providing feedback to a person who is not a driver of the autonomous vehicle while operating in the manual operational mode.

6. The method of claim 1, wherein acquiring driving data relating to the manual driving maneuver includes predicting the manual driving maneuver for a predetermined amount of time in the future.

7. The method of claim 1, further including:
while the autonomous vehicle is operating in the manual operational mode, identifying a wrong perception by a human driver of the autonomous vehicle, the wrong perception being an initiation of a lane change by the human driver when there is an object located in a blind spot of the vehicle; and
providing feedback to the human driver about the wrong perception.

8. The method of claim 1, further including:
responsive to determining that the manual driving maneuver is unacceptable, recording the acquired driving data for playback to a user.

9. A method of assessing human driving performance using an autonomous vehicle, the autonomous vehicle having a manual operational mode and one or more autonomous operational modes, the method comprising:
while the autonomous vehicle is operating in the manual operational mode, acquiring in real-time, using one or more environment sensors located onboard the autonomous vehicle, driving environment data of at least a portion of an external environment of a vehicle;
generating, validating, or updating a driving scene model using the acquired driving environment data;
while the autonomous vehicle is operating in the manual operational mode, acquiring in real-time, using one or more sensors located onboard the autonomous vehicle, driving data relating to a manual driving maneuver;
evaluating, using one or more processors, the acquired driving data relative to the driving scene model to determine whether the manual driving maneuver is acceptable or unacceptable, the evaluating including:
assigning a score to the manual driving maneuver;
comparing the assigned score to a predetermined threshold;
if the assigned score is above the predetermined threshold, the manual driving maneuver is determined to be acceptable; and
if the assigned score is below the predetermined threshold, the manual driving maneuver is determined to be unacceptable; and responsive to determining that the manual driving maneuver is unacceptable, providing feedback to a user via one or more vehicle components, the feedback including passive feedback, whereby the feedback is provided after operation of the autonomous vehicle has stopped or a period of time after the manual driving maneuver has been completed, and the feedback including visual, haptic, or audible feedback.

10. A system for assessing human driving performance using an autonomous vehicle, the system comprising:
an autonomous vehicle, the autonomous vehicle being operable in a manual operational mode and in one or more autonomous operational modes;
a processor, when the autonomous vehicle is operating in the one or more autonomous operational modes, the processor being programmed to initiate executable operations comprising:
determining one or more potential autonomous driving maneuvers for the autonomous vehicle;
evaluating the one or more potential autonomous driving maneuvers relative to a predetermined standard to determine whether the one or more potential autonomous driving maneuvers are acceptable or unacceptable; and
causing a selected one of the potential autonomous driving maneuvers to be implemented, whereby the autonomous vehicle is navigated or maneuvered along a travel route;
one or more sensors located onboard the autonomous vehicle, the one or more sensors being configured to acquire in real-time driving data relating to a manual driving maneuver while the autonomous vehicle is operating in the manual operational mode; and
one or more environment sensors located onboard the autonomous vehicle, the one or more sensors being configured to acquire in real-time driving environment data of at least a portion of an external environment of a vehicle,
the processor being operatively connected to receive acquired driving data from the one or more sensors, the processor being programmed to initiate executable operations comprising:
generating, validating, or updating a driving scene model using the acquired driving environment data;
evaluating the acquired driving data relative to the driving scene model to determine whether the manual driving maneuver is acceptable or unacceptable based on a predetermined standard, the predetermined standard being the same standard used to determine whether one or more potential autonomous driving maneuvers is acceptable or unacceptable when the autonomous vehicle is operating in the one or more autonomous operational modes; and
responsive to determining that the manual driving maneuver is unacceptable, providing feedback to a user via one or more vehicle components, whereby the feedback is provided after operation of the autonomous vehicle has stopped or a period of time after the manual driving maneuver has been completed, the feedback including passive feedback, and the feedback including visual, haptic, or audible feedback.

11. The system of claim 10, wherein the feedback further includes active feedback, wherein the active feedback includes causing the autonomous vehicle to automatically implement one or more corrective driving actions.

12. The system of claim 10, wherein the feedback further includes active feedback, wherein the active feedback includes causing the autonomous vehicle to automatically provide haptic feedback to a driver of the autonomous vehicle.

13. The system of claim 12, further including:
a driver seat; and
one or more haptic actuators operatively connected to the driver seat, wherein the processor is operatively connected to cause the one or more haptic actuators to provide haptic feedback by the driver seat.

14. The system of claim 10, wherein providing feedback to the user includes providing feedback to a person who is not a driver of the autonomous vehicle while operating in the manual operational mode.

15. The system of claim 10, wherein the executable operations further include:
while the autonomous vehicle is operating in the manual operational mode, identifying a wrong perception by a human driver of the autonomous vehicle, the wrong perception being an initiation of a lane change by the human driver when there is an object located in a blind spot of the vehicle; and
providing feedback to the human driver about the wrong perception.

16. A system for assessing human driving performance using an autonomous vehicle, the autonomous vehicle having a manual operational mode and one or more autonomous operational modes, the system comprising:
one or more sensors located onboard the autonomous vehicle, the one or more sensors being configured to acquire in real-time driving data relating to a manual driving maneuver while the autonomous vehicle is operating in the manual operational mode;

one or more environment sensors located onboard the autonomous vehicle, the one or more sensors being configured to acquire in real-time driving environment data of at least a portion of an external environment of a vehicle; and a processor, the processor being operatively connected to receive acquired driving data from the one or more sensors, the processor being programmed to initiate executable operations comprising:

generating, validating, or updating a driving scene model using the acquired driving environment data;

evaluating the acquired driving data relative to the driving scene model to determine whether the manual driving maneuver is acceptable or unacceptable, the evaluating including:

assigning a score to the manual driving maneuver;

comparing the assigned score to a predetermined threshold;

if the assigned score is above the predetermined threshold, the manual driving maneuver is determined to be acceptable; and if the assigned score is below the predetermined threshold, the manual driving maneuver is determined to be unacceptable; and responsive to determining that the manual driving maneuver is unacceptable, providing feedback to a user via one or more vehicle components, the feedback including passive feedback, whereby the feedback is provided after operation of the autonomous vehicle has stopped or a period of time after the manual driving maneuver has been completed, and the feedback including visual, haptic, or audible feedback.

* * * * *